Figure 1:
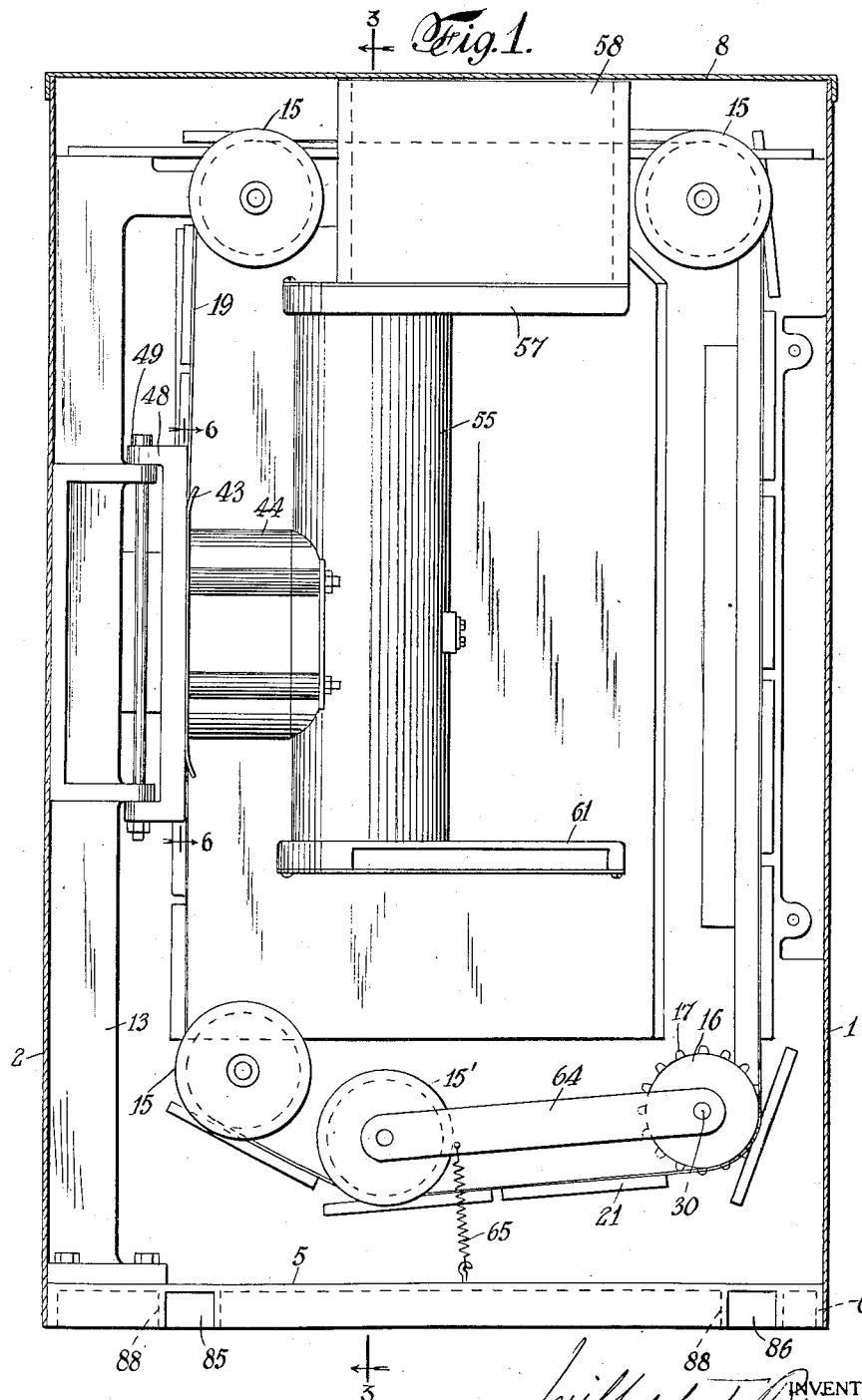

July 26, 1932. W. T. BIRDSALL 1,868,722
PROJECTOR
Filed June 8, 1926 5 Sheets-Sheet 1

July 26, 1932.  W. T. BIRDSALL  1,868,722
PROJECTOR
Filed June 8, 1926  5 Sheets-Sheet 4

July 26, 1932.  W. T. BIRDSALL  1,868,722
PROJECTOR
Filed June 8, 1926   5 Sheets-Sheet 5
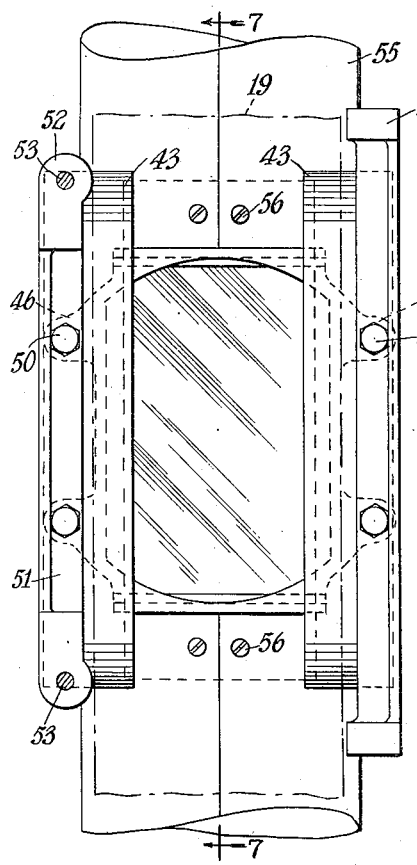
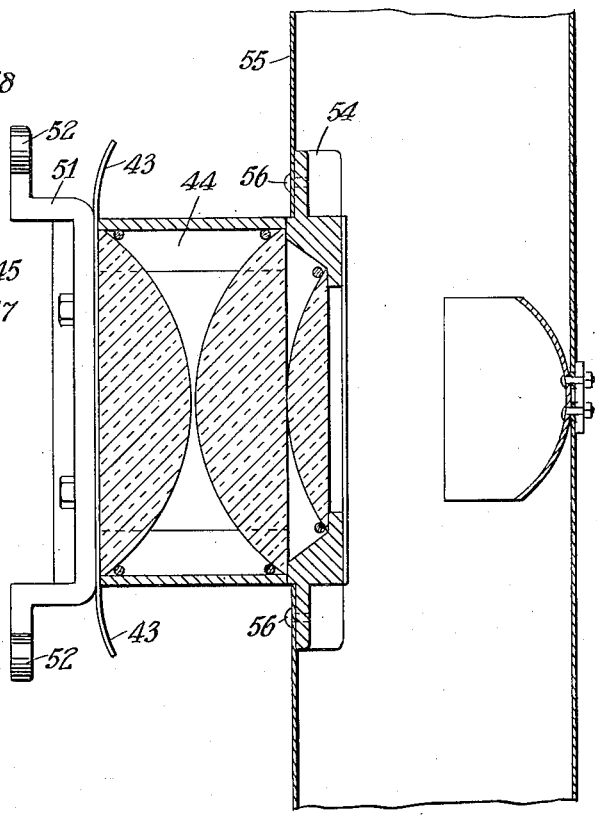
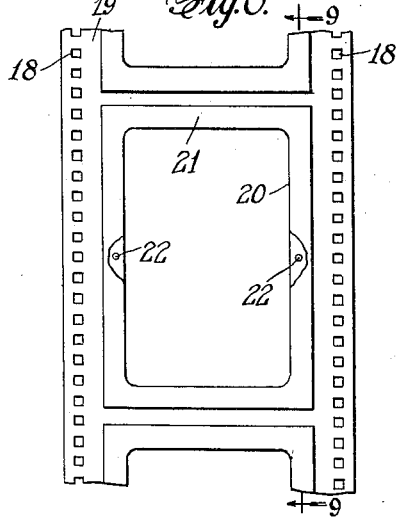
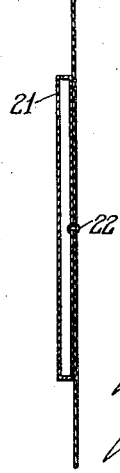
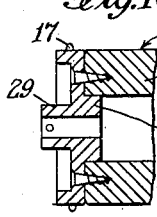
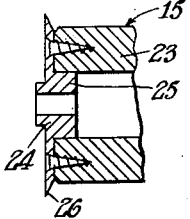

Patented July 26, 1932

1,868,722

BEST AVAILABLE COPY

UNITED STATES PATENT OFFICE

WILFRED T. BIRDSALL, OF MONTCLAIR, NEW JERSEY, ASSIGNOR TO TRANS-LUX DAYLIGHT PICTURE SCREEN CORPORATION, OF NEW YORK, N. Y., A CORPORATION OF DELAWARE

PROJECTOR

Application filed June 8, 1926. Serial No. 114,404.

This invention relates to a projector of the type in which a translucent screen is employed and in which the entire projecting apparatus is contained within a suitable casing. In this type of projector it is, of course, desirable to employ as large a screen as possible in order to present thereon a projection which may be readily seen by a large number of persons. These projectors are of particular value in advertising, as in store windows or other public places, and one of the objections to prior art projectors has been that in order to obtain the desired size of picture upon the screen, a large casing or one of special form has had to be employed. The pictures are normally arranged on a plurality of slides which are consecutively brought into position to be projected upon the screen and these slides are of relatively small size. In order to magnify them to a size which will be readily seen by a large number of persons when projected upon a screen, it is necessary to provide a long throw of the projecting beam of light. This fact has caused the use of large casings, or casings of special form, in order to obtain the desired throw.

It is one of the principal objects of my invention to provide a projector which shall be extremely compact and which shall be capable of arrangement in a small rectangular casing. This object I achieve by the special arrangement of screen, mirrors and source of light, which will be more fully described later.

A further object of my invention is to provide a projector having a conveyor adapted to carry a plurality of slides and so constructed and arranged as to be readily removed from the projector without the necessity of disarranging the optical system or operating parts.

A still further object of my invention is to provide a ventilating system of novel and improved form. In projectors of the type referred to, it is customary to place a projector in use and to operate it continuously for a long period of time. Previous ventilating systems have usually provided means for passing a current of air through all parts of the projector casing. When the machine is in operation for a long time, a deposit of dust is sure to be formed upon the slides and this deposit will detract from the efficient projection of the slides upon the screen. I avoid this difficulty by providing a ventilating system which shall confine the ventilating draft of air to the source of light where the heat is generated. I also so arrange the ventilating system that a strong draft of cooling air is caused by the action of the heated air from the lamp itself without the necessity of employing any forced ventilation.

Further objects of my invention are to provide a novel and improved mounting for certain of the mirrors employed in my optical system and which shall provide ready adjustment means, to provide a base which may be readily altered so as to permit the use of the projector with a conveyor of greater length, and to provide a special type of conveyor which makes possible a more convenient handling thereof and makes possible an improved presentation of the slides on the conveyor at the exposure position.

Still further objects will become apparent during the description of the selected embodiment of my invention which I have shown in the accompanying drawings in which: Fig. 1 is an elevation of the back of a projector constructed according to my invention, the back wall of the casing being removed to better show the parts.

Figure 2:
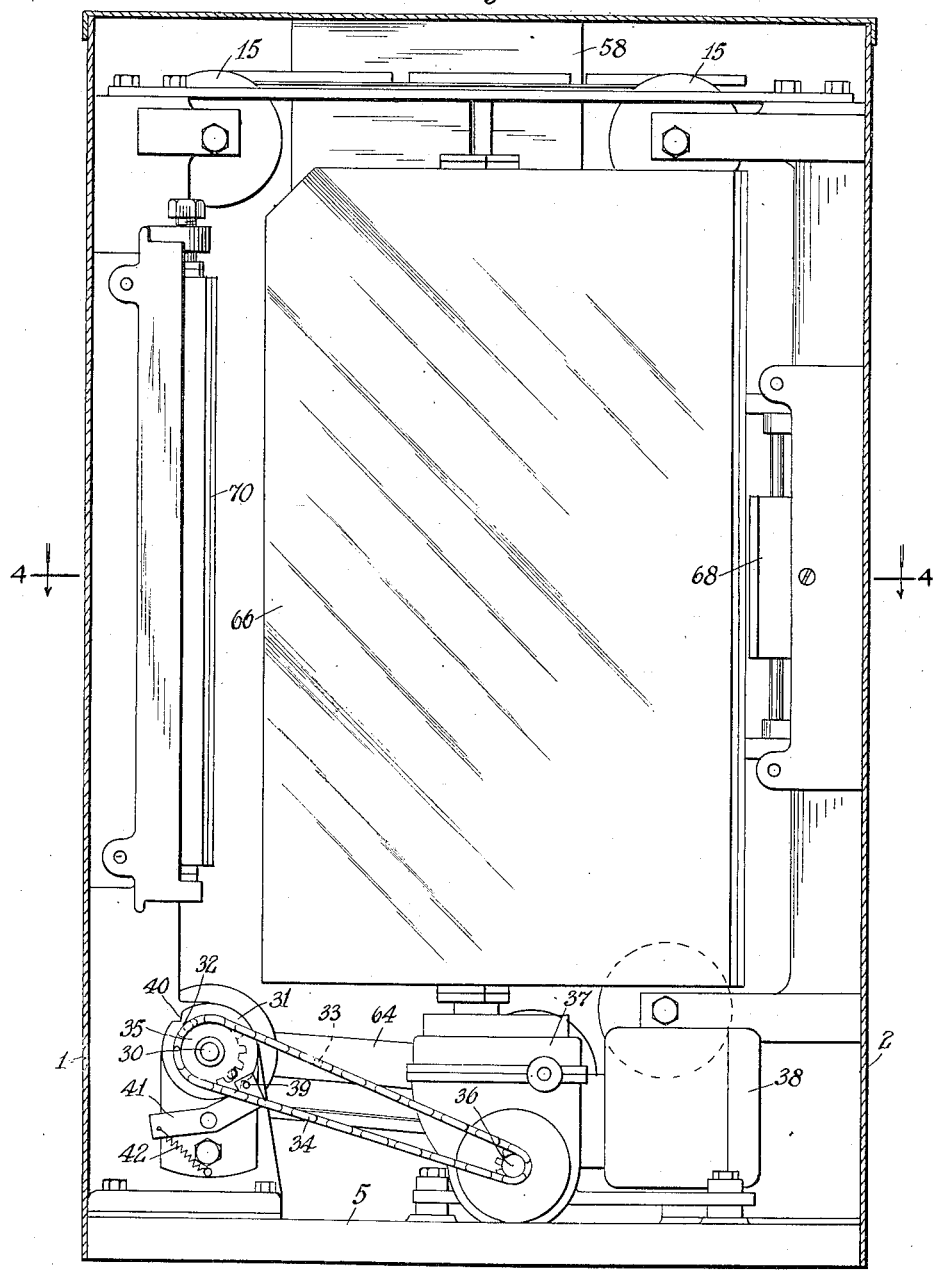

Fig. 2 is an elevation of the front of the projector shown in Fig. 1, the front wall being removed.

Figure 3:
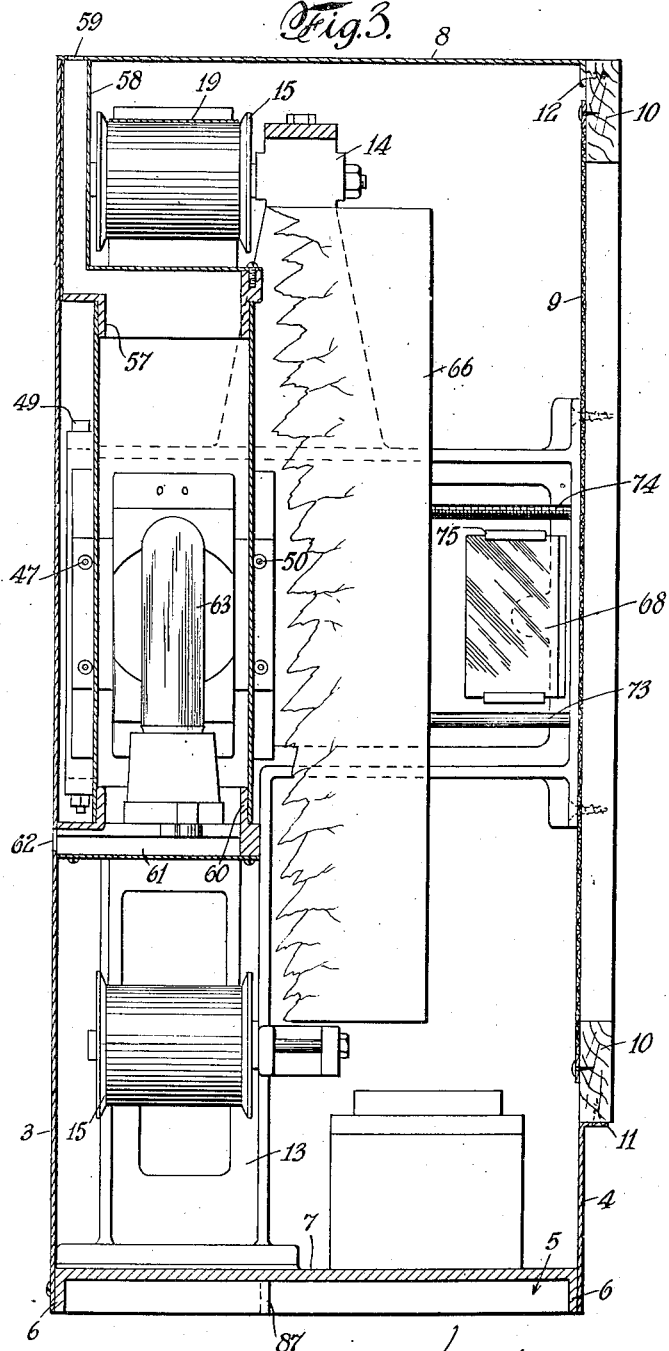
Figure 4:
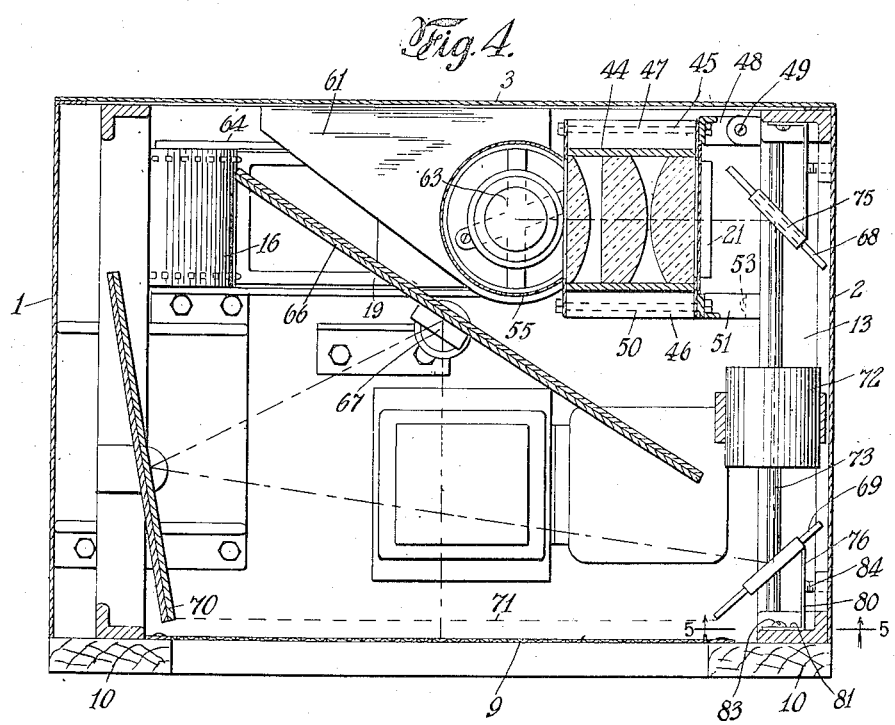
Figure 5:
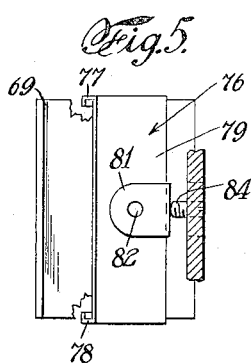

Fig. 3 is a section on line 3, 3, of Fig. 1.
Fig. 4 is a section on the line 4, 4, of Fig. 2.
Fig. 5 is a section on the line 5, 5, of Fig. 4.
Fig. 6 is a view taken on the line 6, 6, of Fig. 1.
Fig. 7 is a section on the line 7, 7, of Fig. 6.
Fig. 8 is a face view of a portion of a conveyor constructed according to my invention.
Fig. 9 is a section on the line 9, 9, of Fig. 8.
Fig. 10 is a fragmentary section showing one type of roller employed with my invention.
Fig. 11 is a view similar to Fig. 10, but showing a different form of roller.

Referring now to the drawings in detail,

I have shown my invention as embodied in a projector enclosed within a casing having the side walls 1 and 2, the rear wall 3 and the front wall 4. These walls are preferably secured to a base 5 which may be formed of a casting having the peripheral flanges 6 to support the top 7 of the base a slight distance above the support upon which the casing may rest. The casing is closed at the top by means of the cover 8. Inserted in the front wall 4 is a screen 9 and this screen is translucent so as to permit projection thereon of pictures from slides suitably supported on the interior of the casing. The screen is preferably secured to the rear of a frame 10 and this frame is secured to the wall at the flanges, 11 and 12.

Mounted within the casing is a suitable frame 13, which frame is adapted to support the operating parts of the projector. Mounted in suitable bearings 14 are a plurality of shafts carrying rollers 15 and 16. The rollers 15 are idlers while the roller 16 is a sprocket roller, the teeth 17 of which are adapted to engage in perforations 18 adjacent the edges of the conveyor 19 best shown in Figure 8.

This conveyor comprises a flexible band of sheet material, preferably sheet copper. In projectors of this character, it has been customary to employ various constructions of chain conveyors or to fasten the slides directly to each other. Both of these types of construction are complicated and unsatisfactory in that they make it difficult to obtain proper registration of the slides with the projection aperture. A chain will stretch to such an extent as to make registration impossible without the use of complicated mechanism. This difficulty, however, is avoided by the use of a band of material such as copper, which is practically nonstretchable. Other materials may, of course, be used in place of copper if found satisfactory, but I have found that a copper band is very efficient. The band 19 is provided with a plurality of apertures 20 and registering with these apertures are the slides which may be placed in suitable holders 21. While these holders may be of any suitable construction, I have shown them as being made in the form described and claimed by me in my copending application Serial No. 102,596, filed April 16, 1926. These holders are made of sheet material adapted to be riveted to the conveyor by a pair of centrally disposed rivets 22, one rivet on either side of the holder. By this means the holders are held in proper position on the conveyor and yet form no obstacle to the bending of the conveyor around a roller.

In Figs. 10 and 11, I have shown details of the construction of the rollers 15 and 16 over which the conveyor band 19 is adapted to be trained. Each roller 15 is conveniently made in the form of a hollow spool 23 having secured to each end thereof a flange member 24, this member having a boss 25 received within the central bore of the spool. The member 24 has a circular flange 26 extending beyond the periphery of the spool so as to retain the conveyor thereon.

The sprocket roller 16 comprises a similar spool 27 in the central bore of which is received the boss 28 of a member 29 carrying the sprocket teeth 17. The members 24 and 29, respectively, may be secured to the shafts upon which the rollers are mounted.

The sprocket wheel 16 is secured to the shaft 30 to the front end of which is secured the disk 31 having thereon pins 32 adapted to be engaged by a dog 33 upon the chain 34. This chain is trained over the pulley 35 rotatably mounted on the shaft 30 and over the pulley 36 which is connected by suitable gearing enclosed in the gear casing 37 to the motor 38. By this means, operation of the pulley 36 through the motor 38 will cause the dog 33 to intermittently engage the pins 32 to give a partial rotation to the shaft 30. The shaft is held in proper position during its inactive periods by means of a detent 39 adapted to be received in notches 40 in the periphery of the disk. This detent is mounted upon an arm 41 which is urged toward the disk by the spring 42. The operation of this device will be sufficiently clear for the purposes of this application. The device itself is further described and is claimed in my copending application Serial No. 114,407, filed June 8, 1926.

The slides in the holders 21 will be successively brought to exposure position by the intermittent motion just described. The exposure position or aperture is defined by the guides 43 which are disposed one on each side of the condenser housing 44. These guides are adapted to contact with the conveyor adjacent its edges in the manner best shown in Figure 6, wherein the conveyor is shown in dotted lines. By this means the slides carried by the conveyor are presented to the exposure aperture and properly guided by contact of a flexible conveyor with the guides 43. The operation of the conveyor is so timed that a slide will be brought to position wherein its center will coincide with the center of the condenser housing during the rest period of the intermittent motion. Thus it will be seen that all the advantages of a flexible film are obtained, combined with the advantages of a series of slides for projection purposes. A flexible conveyor is much more readily handled than is a chain or equivalent structure, as is well known to those skilled in the art, and by my construction I attain this ease of handling in a machine for projecting slides.

The condenser housing 44 is provided with a plurality of ribs 45 and 46 upon opposite sides thereof. The ribs 45 support bolts 47 by means of which the housing is secured to the hinge member 48, this member being hinged at 49 to the frame 13. The ribs 46 carry bolts 50 which secure the condenser housing to the bracket 51 having ears 52 by means of which the bracket is bolted to the frame 13, as by bolts 53. The details of this construction are shown and claimed in my copending application, Serial No. 114,405, filed June 8, 1926.

The condenser housing is provided at its rear end with a flange 54 received within the lamp housing 55, as best shown in Figure 7. This housing is conveniently made in the form of a sheet metal cylinder secured to the flange 54 as by screws 56. Inserted in the upper end of the lamp housing is a member 57 provided with a central bore whereby air from the lamp housing may pass therethrough. This member terminates in a discharge duct 58 which is relatively flat and wide so that air passing therethrough may expand rapidly. The upper end of the duct 58 registers with an aperture 59 in the top of the casing closely adjacent the end of the duct. Disposed in the lower end of the lamp housing is another member 60 terminating in a duct 61, which is likewise of a relatively wide flat cross section. The end of the duct 61 registers with an inlet aperture 62 in the side of the casing closely adjacent the end of the duct.

By the means just described, the lamp housing is properly ventilated without the necessity of employing a forced draft. It will be seen that the casing is entirely closed except for the two apertures 59 and 62. Air admitted through the aperture 62 will pass through the inlet duct 61, through the lamp housing, and through the discharge duct 58. When the lamp 63 is lighted, the heat generated thereby will cause the air in the housing to rise and create a draft. The air entering through the aperture 62 will gradually increase in velocity due to the fact that the passage decreases in cross section as it approaches the lamp housing. Similarly, the velocity will decrease as it passes through the discharge duct. The result is a sufficient draft of air to properly ventilate the lamp housing and keep it at a sufficiently low temperature to prevent overheating thereof. At the same time the draft is confined directly to the lamp house and there is no opportunity for dust to collect upon the slides which are thoroughly protected by the closed casing.

It will be seen that the duct 58 is offset with relation to the lamp house to provide space for the passage of the conveyor thereover. Similarly, the duct 61 is disposed within the path taken by the conveyor. The conveyor is disposed adjacent the rear wall 3 of the casing and with its center line parallel thereto. The conveyor is endless and I dispose within the path taken thereby the lamp and condenser thus economizing space and making possible the compact arrangement desired. The bearings upon which the rollers 15 and 16 are mounted are single bearings disposed on the side of the rollers removed from the back wall. Therefore, when the back wall is removed, the conveyor may be taken off the rollers and removed from the casing without interference by any bearing supports. In order to facilitate and make possible the removal of the conveyor, the lamp house is hinged at 49, as previously described. By this means, the lamp house condenser and ventilating ducts may be swung out of the casing when the rear wall 3 is removed and then the conveyor may be lifted from the rollers and removed from the casing. When the lamp house and other parts are swung back into position in the casing, the bolts 53 are put in position to secure the bracket 51 to the frame 13 and then all parts are held in rigid position where they will be adequately supported without undue strain upon the hinge. This structure is a very rigid and rugged one, particularly adapted to the rough usage which projectors of this type sometimes receive.

In order to further facilitate the insertion and removal of the conveyor, I mount one roller 15' on a pivoted arm 64 which is urged downwardly by means of the spring 65. The conveyor is provided with a certain amount of slack and this slack is taken up by the roller 15'. Then the conveyor will obviously be maintained in taut condition, but upon raising of the roller 15' the conveyor may be removed with ease.

The screen 9 is placed in the front wall of the casing, as stated above, and it will be observed that it occupied substantially the entire front thereof. This is made possible by the fact that I have so utilized the space on the interior of the casing that the required throw is obtained. Disposed directly behind the screen is the mirror 66 which faces the screen and is pivotally mounted at 67 so that it may be adjusted to the proper angle to deflect a beam of light to the screen. The beam of light originates at the lamp and passes through the condenser 44 and through the slide disposed at the projection aperture, in the well known manner. After passing through the slide, the beam of light is directed to the mirror 66 by means of a plurality of mirrors 68, 69 and 70. It will be seen that the mirror 70 is disposed adjacent one side of the screen 9 and is so arranged as to deflect light away from the screen to the mirror 66, the angles of these two mirrors being such that the light will pass to the screen in a path normal thereto. The mirrors 66 and 70 are therefore arranged to form an acute angle with each other and the beam of light enters this angle in a path so that the front edge 71 thereof is substantially parallel and closely adjacent to the screen. The beam of light therefore forms a closed figure and the maximum economy of space is achieved.

An arrangement of mirrors corresponding somewhat to the arrangement of my mirrors 66 and 70, is shown in the patent to Guerzoni et al., No. 1,153,685, granted September 14, 1915. However, my device is a radical improvement over that shown by this patent in that I utilize my space much more economically. The beam of light passing to my mirror 70 has its front edge closely adjacent and parallel to the screen, and furthermore, the source of light and the object which is to be projected upon the screen is disposed behind the mirror 66, thus utilizing space which would be wasted otherwise. The mirror 66 being disposed upon an angle to the screen provides a space between its back and the back wall of the casing which I utilize for the source of light and associated structure. By also using this space to receive the conveyor for the slides, a still further economy is achieved. This economy is made still greater by arranging the conveyor, as previously described, with its center line parallel to the rear wall and adjacent thereto and having the source of light received within the closed path traveled by the conveyor.

It is, of course, understood that the arrangement of optical system shown may be employed to project upon the screen any suitable object, although in this application the object is exemplified by a slide upon the conveyor. The light from the object is directed by means of the mirrors 68, 69, 70 and 66, to the screen which, being translucent, permits the image projected thereon to be viewed from the front of the casing. A suitable objective 72 may be disposed between the mirrors 68 and 69 and slidably mounted on a rod 73 upon which the objective may be adjusted by means of a threaded rod 74.

The mirrors 66 and 70 are pivotally mounted at their centers so as to be adjusted. Such adjustment will not affect the focusing of the image upon the screen because the length of the center line of the beam of light remains the same. This is due to the fact that the mirrors are adjusted about their centers.

In order to adjust the mirrors 68 and 69, I have mounted them in the manner best shown in Figs. 4 and 5. In these figures, it will be seen that the mirrors 68 and 69 are mounted in brackets 75 and 76, respectively. These brackets are similar in construction and, therefore, I shall limit my description to the bracket 76, which is shown in detail in Fig. 5. This bracket comprises a single sheet of material formed with upper and lower channels 77 and 78 which receive the mirror 69. Extending rearwardly from the plate 79 on which the channels are formed, is an arm 80 which, in this embodiment, is provided at its rear end with an inwardly turned foot 81 which is apertured at 82 to receive a suitable fastening means 83 whereby the foot may be secured to the frame of the machine. The material of which the bracket is made is preferably spring metal and the entire bracket may be adjusted by means of an adjusting screw 84, the resiliency of the metal being relied upon to urge the bracket in one direction and the screw forcing it in the other direction. The above described means exemplifies a bracket which may be very readily and cheaply made, which shall properly support a mirror and which may be readily adjusted to vary the angle of the mirror.

Referring particularly to Figs. 1 and 3, it will be seen that the base is supplied with a peripheral flange 6. It may be found desirable to use a casing on a hollow pedestal or upon some other means making possible the use of a longer conveyor. I therefore provide means which will permit a projector as described above, to be readily placed on top of such a pedestal or the like. With this end in view, I offset the flange to form recesses 85 and 86 beneath the vertical stretches of the conveyor. As shown in Fig. 3, the rear of the recesses is formed by the offset flange 87. Then when it is desired to modify the projector to permit use of a longer conveyor, all that is necessary to do is to cut out the metal of the base top above the recesses 85 and 86. The conveyor may then be extended down through the base into a hollow pedestal or other container, and the base will still be provided with a peripheral flange it being noted that the rear flange 87 of the recesses is joined to the peripheral flange 6 by means of side walls 88.

It will also be noted that the rollers 15, shown at the left of Fig. 1, are disposed rearwardly of the guides 43 to such an extent that the conveyor 19 is stretched across the guides and thus preserved taut. This insures that the slide which is brought to rest in the projection aperture will be correctly disposed with respect to the projection system and prevents movement thereof during projection.

Through the description and claims, I have made use of the expressions "rear" and "front." Normally, the front of a projector casing is the wall supporting the screen. I do not intend to limit myself, however, in this manner; the terms "rear" and "front" being merely relative and the front of the wall being defined as the one in which the screen is mounted. This is the only limitation I intend to place upon these terms.

Similarly, the term "mirror" has been used and will be used in the claims to define a suitable reflector. This reflector may be of any character suitable for the purpose, and when I employ the term "mirror" I do so for simplicity of expression and not as limiting the type of structure.

The operation and the advantages of the projector described above will be apparent from the foregoing description and no review thereof is deemed necessary. It will be apparent that I have achieved improved constructions which will achieve the objects set forth at the beginning of this specification. These objects are all achieved by simplified structure which is particularly adapted to a projector designed for commercial use. In such projectors it is important to reduce the service expense to a minimum, and this will be accomplished by my projector.

I am aware that various changes may be made in the construction which I have described and illustrated without departing from the scope of my invention, and, therefore, I do not intend to limit myself except by the appended claims.

I claim:—

1. In combination, a casing having two substantially parallel walls, a screen disposed in one of said walls, a slide disposed adjacent to the other of said walls, a source of light for illuminating said slide, and means for directing light from said slide to said screen, said means comprising two mirrors, one disposed between said slide and screen and facing said screen and the other adjacent one side of the screen and directing light away from the screen toward said first mirror, said means further comprising a third mirror which passes light to said second mirror, the light received by said second mirror crossing the light directed by said first mirror to said screen.

2. A projector comprising a rectangular casing, a screen in the front wall of said casing, an object disposed adjacent to the rear wall of the casing, a source of light to illuminate said object and also disposed adjacent said rear wall, a mirror in one of the rear corners of the casing and adapted to receive light from said object, a second mirror in one of the front corners of said casing on one side of said screen and adapted to receive light from said first mirror and to project it with one edge of the beam substantially parallel to the screen and adjacent thereto, and a third mirror disposed on the other side of the screen and adapted to receive the light from said second mirror and to project the light to a fourth mirror, said fourth mirror facing the screen and deflecting the light thereto.

3. The combination with a casing, and a screen in one wall thereof, of a source of light in said casing, a mirror system in said casing for deflecting light to said screen, said mirror system comprising mirrors facing each other and disposed immediately adjacent opposite sides of said screen, a beam of light from said source coacting with a representation-bearing object and with said mirrors in succession whereby images of the representations appear on said screen, said mirror system comprising a mirror receiving light from one of said first named mirrors and directing the same to said screen.

4. The combination with a casing, and a screen in one wall thereof, of a mirror system in said casing for deflecting light to said screen, said mirror system comprising a mirror facing said screen and directing light thereto, said mirror with angularly related walls of said casing partially defining a space at the side of said mirror facing away from said screen, and a source of light and a representation-bearing object in said space, said mirror system comprising mirrors facing each other and disposed immediately adjacent opposite sides of said screen, light from said source coacting with said last named mirrors in succession to direct the light to the first mentioned mirror.

In testimony whereof, I have affixed my signature to this specification.

WILFRED T. BIRDSALL.